United States Patent
Shireman

(10) Patent No.: US 7,087,566 B2
(45) Date of Patent: Aug. 8, 2006

(54) PAINT REMOVING COMPOSITION

(75) Inventor: Dennis E. Shireman, Marion, AR (US)

(73) Assignee: W.M. Barr & Company, Inc., Memphis, TN (US)

( * ) Notice: Subject to any disclaimer, the term of this patent is extended or adjusted under 35 U.S.C. 154(b) by 0 days.

(21) Appl. No.: 10/819,614

(22) Filed: Apr. 7, 2004

(65) Prior Publication Data

US 2005/0227889 A1 Oct. 13, 2005

(51) Int. Cl.
*C11D 7/26* (2006.01)
*C11D 7/32* (2006.01)
*C11D 7/50* (2006.01)

(52) U.S. Cl. .................... 510/212; 510/101; 510/213; 510/473; 510/500

(58) Field of Classification Search ............... 510/201, 510/202, 213, 200, 473, 500, 101
See application file for complete search history.

(56) References Cited

U.S. PATENT DOCUMENTS

| 2,507,983 | A | | 5/1950 | Kuentzel | |
|---|---|---|---|---|---|
| 4,120,810 | A | | 10/1978 | Palmer | |
| 4,666,626 | A | | 5/1987 | Francisco | |
| 4,749,510 | A | | 6/1988 | Nelson | |
| 4,812,255 | A | | 3/1989 | Suwala | |
| 5,006,279 | A | | 4/1991 | Grobbel et al. | |
| 5,011,621 | A | | 4/1991 | Sullivan | |
| 5,049,300 | A | | 9/1991 | Fusiak et al. | |
| 5,288,335 | A | * | 2/1994 | Stevens | 510/106 |
| 5,298,184 | A | | 3/1994 | Jarema | |
| 5,332,526 | A | * | 7/1994 | Stanley | 510/212 |
| 5,468,415 | A | | 11/1995 | Jarema | |
| 5,478,491 | A | | 12/1995 | Jarema | |
| 5,609,678 | A | * | 3/1997 | Bergman | 106/311 |
| 5,753,603 | A | | 5/1998 | Lallier et al. | |
| 6,001,192 | A | | 12/1999 | Lallier et al. | |
| 6,929,702 | B1 | * | 8/2005 | Motsenbocker | 134/6 |

* cited by examiner

*Primary Examiner*—Gregory R. Del Cotto
(74) *Attorney, Agent, or Firm*—Baker, Donelson, Bearman, Caldwell & Berkowitz, PC

(57) ABSTRACT

A composition and related process for removing paint from a substrate in which the composition contains d-limonene.

14 Claims, No Drawings

PAINT REMOVING COMPOSITION

TECHNICAL FIELD

The present invention relates to a composition for removing paint from a substrate. In a more specific aspect, this invention relates to a paint removing composition which contains d-limonene.

This invention also relates to a process for removing paint from a substrate by using a composition which contains d-limonene.

In this application, the term "paint" will be understood to refer to coatings such as epoxies, enamels, latexes, primers, basecoats, clearcoats, lacquers, varnishes, shellacs and polyurethane finishes which are used to protect and/or beautify substrates. As used in this application, the term "paint removal" refers to compositions which remove or facilitate the removal of paint from a substrate.

BACKGROUND OF THE INVENTION

Chemical based paint removers (also referred to as "paint strippers") have enjoyed widespread commercial application due to their relative ease of use when compared to various physical scraping and/or sanding methods of paint removal. Many of these paint removers are solvent based, utilizing methylene chloride, methanol, butanol or other solvent components. While these solvents yield significant paint removal, they may also present potential health, safety and environmental concerns to both the user and the surrounding environment.

U.S. Pat. No. 2,507,983 discloses a paint stripper which contains methylene chloride and methylcellulose, which is a thickening agent used to increase the viscosity of the formulation. Methylene chloride is an effective low cost paint stripper characterized by high vapor pressure (400 mm Hg at 75° F.) which causes the methylene chloride to evaporate very rapidly. This high vapor pressure may lead to a vapor inhalation hazard. In addition, mehtylene chloride is a suspected carcinogen as well as a dermal irritant. A further concern of methylene chloride deals with possible ground water contamination when the residual stripper is removed from the substrate.

In an effort to reduce the health, safety and toxicity concerns related to methylene chloride based paint strippers, several formulations utilizing N-methyl-2-pyrrolidone (NMP) have been developed. NMP has been proposed as a substitute for chlorinated solvents because of its effectiveness, low toxicity, biodegradability and high flash point.

U.S. Pat. No. 5,049,300 discloses paint stripping compositions which include formic acid, NMP and ethyl-3-ethoxypropionate. This formulation acidifies the NMP with an organic or inorganic acid with a pH of 4.0 or less, with formic, sulfuric or phosphoric acid being preferred.

U.S. Pat. Nos. 4,812,255 and 4,749,510 also use formic acid as a component of the overall composition. However, each of the above formulations still presents a dermal safety hazard due to the low pH of the formic acid (pH=2.3) and other components.

U.S. Pat. No. 5,006,279 discloses a paint stripper composition which includes NMP and at least one mononuclear aromatic hydrocarbon.

Similarly, U.S. Pat. Nos. 4,120,810; 4,749,510 and 4,666,626 contain aromatic hydrocarbons within the paint stripper formulations.

These and other formulations, however, may still present potential health, safety and dermal hazards based on the absorption rate of the particular aromatic hydrocarbon or aromatic solvent used. In addition, many aromatic hydrocarbons are believed to be carcinogenic, pose environmental concerns and are troublesome regarding disposal of spent chemical.

U.S. Pat. No. 5,011,621 relates to mixtures of NMP, selected co-solvents (which may include aromatic hydrocarbons and terpenes such as d-limonene), as well as animal and/or vegetable oil, as a means to effectively remove paint from substrates. However, the presence of one or more of these natural components, such as tallows and fatty acids, may lead to the growth of microbiological organisms within the formulation, thereby decreasing the shelf life of the product. The presence of microbiological organisms could lead to altered product performance as well as a noxious and rancid odor, especially when the product is exposed to sunlight.

Thus, there remains a need in the industry to provide an effective paint removal composition which has a less than offensive odor, a long shelf life and is effective for the removal of most paints.

SUMMARY OF THE INVENTION

The present invention provides a composition for removing paint from a substrate. As compared to the compositions of the prior art as described above, the composition of this invention is more effective in removing paint from a substrate in an equivalent amount of time. In addition, the compositions of this invention have high vapor and boiling points, which result in a lower evaporation rate.

The present invention also provides a process for using this composition for removing paint from a substrate.

Briefly described, the present invention removes paint from a substrate by using a new and advantageous composition which contains d-limonene, N-methyl-2-pyrrolidone, a thickening agent and mineral spirits. Each component in the composition is used in a defined weight percent range, based on the total weight of the composition.

Accordingly, an object of this invention is to provide a composition for removing paint from a substrate.

Another object of this invention is to provide a composition for removing paint from a substrate wherein the composition is effective in removing paint in a short amount of time.

Another object of this invention is to provide a composition wherein the composition has a low evaporation rate.

Still another object of this invention is to provide a process for removing paint from a substrate.

Still another object of this invention is to provide a process for removing paint from a substrate by using a composition which is effective in removing paint in a short amount of time.

Still another object of this invention is to provide a process for removing paint from a substrate by using a composition which has a low evaporation rate.

These and other objects, features and advantages of the present invention will become apparent from the following description.

DETAILED DESCRIPTION OF THE INVENTION

The present invention provides a composition for removing paint from a substrate, wherein the composition comprises N-methyl-2-pyrollidone, d-limonene, a thickening agent and mineral spirits. The present invention also provides a process by which the above-defined composition is used to remove paint from a substrate.

As used in this application, the term "substrate" will be understood to include wood, metal, antique surfaces, porcelain, ceramic and other types of surfaces to which paint can be applied.

As defined above, there are four essential components in the composition of this invention. These components and their corresponding weight percent ranges are shown below, with the weight percents being based on the total weight of the composition.

| Component | Weight Percent Range |
|---|---|
| N-methyl-2-pyrrolidone | about 40 to about 80 |
|  | (preferably about 60 to about 70) |
| d-limonene | about 10 to about 30 |
|  | (preferably about 10 to about 25) |
| Thickening agent | about 1 to about 5 |
|  | (preferably about 1 to about 3) |
| Mineral spirits | about 5 to about 25 |
|  | (preferably about 5 to about 15) |

If these components are used in amounts outside these ranges, the paint removal composition tends to provide less desirable results.

Although many thickening agents may be used in the composition of this invention, preferably a cellulosic thickening agent is used. A preferred cellulosic thickening agent is methyl cellulose which is available from Dow Chemical Company under the trademark Methocel 856N.

Other components may be added to the composition of this invention to achieve other objectives. Examples of these optional components are colorants, stabilizers, pigments, bittering agents, viscosity enhancers, pH adjusting agents, etc. These optional components can be used in the amounts necessary to achieve the desired objectives.

The present invention is further illustrated by the following example which is designed to teach those of ordinary skill in the art how to practice this invention and to represent the best mode contemplated for carrying out this invention.

EXAMPLE

The following composition is prepared using techniques and process steps which are well known in this industry.

| Component | Weight Percent |
|---|---|
| d-limonene | 19.977 |
| N-methyl-2-pyrollidone | 68.719 |
| low aromatic mineral spirits | 10.000 |
| methyl cellulose | 1.249 |
| pigment | .051 |
| bittering agent | .004 |
|  | 100.000 |

In this Example, the pigment is Chromotint Orange, a pigment available from Chromotech, Inc., and the bittering agent is granules of denatonium benzoate. As known in this industry, a bittering agent is used to deter ingestion.

This composition was then tested for paint removal properties with an alkyd paint and a latex paint, and the results are shown below. Also shown below are the results of this composition as compared to a standard paint removal composition which does not contain mineral spirits . The scores are based on a 0–5 score (per layer of paint), with a maximum score of 15 if all paint is removed. The scores are plotted against the period of time (stated in minutes or hours) during which the painted surface is exposed to the composition.

A. Alkyd Paint—Horizontal Surface

| Standard Composition | Time | Composition of this Invention |
|---|---|---|
| 0 | 5 min. | 0 |
| 0 | 10 min. | 0 |
| 0 | 15 min. | 0 |
| 1.2 | 30 min. | 6.8 |
| 1.8 | 1 hr. | 10.2 |
| 11 | 4 hrs. | 10.2 |
| 11.2 | 24 hrs. | 10 |

B. Alkyd Paint—Vertical Surface

| Standard Composition | Time | Composition of this Invention |
|---|---|---|
| — | 5 min. | — |
| — | 10 min. | — |
| 0 | 15 min. | 0 |
| — | 30 min. | — |
| — | 1 hr. | — |
| 5 | 4 hrs. | 12 |
| 4.2 | 24 hrs. | 4.4 |

C. Latex Paint—Horizontal Surface

| Standard Composition | Time | Composition of this Invention |
|---|---|---|
| 12.2 | 5 min. | 8.8 |
| 11.6 | 10 min. | 10.6 |
| 12 | 15 min. | 13.4 |
| 12 | 30 min. | 13 |
| 13.4 | 1 hr. | 12.6 |
| 12.4 | 4 hrs. | 13.6 |
| 10.4 | 24 hrs. | 13 |

D. Alkyd Paint—Vertical Surface

| Standard Composition | Time | Composition of this Invention |
|---|---|---|
| — | 5 min. | — |
| — | 10 min. | — |
| 11.6 | 15 min. | 12 |
| — | 30 min. | — |
| — | 1 hr. | — |
| 11.4 | 4 hrs. | 12.8 |
| 13 | 24 hrs. | 12.8 |

The above results show that the paint removal composition of this invention removes more of the alkyd paint, on either a horizontal or vertical surface, in a shorter amount of time than does the standard composition. With the latex paint on either surface, the paint removal compositions of this invention is essentially equivalent to the standard composition over an equal amount of time.

This invention has been described in detail with particular reference to certain embodiments, but variations and modifications can be made without departing from the spirit and scope of the invention as defined in the following claims.

What is claimed is:

1. A composition for removing paint from a substrate, wherein the composition consists of:
   A. from 68.719 to about 80 percent by weight of N-methyl-2-pyrrolidone;
   B. from about 10 to about 30 percent by weight of d-limonene;
   C. from about 1 to about 5 percent by weight of a thickening agent; and
   D. from about 5 to about 25 percent by weight of mineral spirits.

2. A composition as defined by claim 1 wherein the N-methyl-2-pyrrolidone is present in an amount from 68.719 to about 70 percent by weight.

3. A composition as defined by claim 1 wherein the d-limonene is present in an amount from about 10 to about 25 percent by weight.

4. A composition as defined by claim 1 wherein the thickening agent is present in an amount from about 1 to about 3 percent by weight.

5. A composition as defined by claim 1 wherein the thickening agent is a cellulosic material.

6. A composition as defined by claim 5 wherein the cellulosic thickening agent is methyl cellulose.

7. A composition as defined by claim 1 wherein the mineral spirits are present in an amount from about 5 to about 15 percent by weight.

8. A process for removing paint from a substrate, wherein the process consists of treating the substrate with a composition which comprises:
   A. from 68.719 to about 80 percent by weight of N-methyl-2-pyrrolidone;
   B. from about 10 to about 30 percent by weight of d-limonene;
   C. from about 1 to about 5 percent by weight of a thickening agent; and
   D. from about 5 to about 25 percent by weight of mineral spirits.

9. A process as defined by claim 8 wherein the N-methyl-2-pyrrolidone is present in an amount from 68.719 to about 70 percent by weight.

10. A process as defined by claim 8 wherein the d-limonene is present in an amount from about 10 to about 25 percent by weight.

11. A process as defined by claim 8 wherein the thickening agent. is present in an amount from about 1 to about 3 percent by weight.

12. A process as defined by claim 8 wherein the thickening agent is a cellulosic material.

13. A process as defined by claim 12 wherein the cellulosic thickening agent is methyl cellulose.

14. A process as defined by claim 8 wherein the mineral spirits are present in an amount from about 5 to about 15 percent by weight.

* * * * *